United States Patent
Barmeier et al.

(10) Patent No.: US 10,401,093 B2
(45) Date of Patent: Sep. 3, 2019

(54) THERMAL ENERGY STORAGE PLANT

(71) Applicant: Siemens Gamesa Renewable Energy A/S, Brande (DK)

(72) Inventors: Till Andreas Barmeier, Hamburg (DE); Volker Seidel, Barcelona (ES)

(73) Assignee: SIEMENS GAMESA RENEWABLE ENERGY A/S (DK)

( * ) Notice: Subject to any disclaimer, the term of this patent is extended or adjusted under 35 U.S.C. 154(b) by 8 days.

(21) Appl. No.: 15/558,264

(22) PCT Filed: Mar. 20, 2015

(86) PCT No.: PCT/EP2015/055913
§ 371 (c)(1),
(2) Date: Sep. 14, 2017

(87) PCT Pub. No.: WO2016/150460
PCT Pub. Date: Sep. 29, 2016

(65) Prior Publication Data
US 2018/0080721 A1    Mar. 22, 2018

(51) Int. Cl.
*F01K 3/02*    (2006.01)
*F01K 3/12*    (2006.01)
(Continued)

(52) U.S. Cl.
CPC ............ *F28D 20/0056* (2013.01); *F01K 3/12* (2013.01); *F01K 5/00* (2013.01); *F01K 3/02* (2013.01);
(Continued)

(58) Field of Classification Search
CPC ......... F28D 20/0056; F28D 2020/0078; F28D 2020/0082; F01K 3/12; F01K 3/02;
(Continued)

(56) References Cited

U.S. PATENT DOCUMENTS 8,707,702 B2    4/2014  Garbe et al.
9,651,030 B2    5/2017  Kim et al.
(Continued)

FOREIGN PATENT DOCUMENTS

CN    101949658 A    1/2011
DE    102013101648 A1    8/2014
(Continued)

OTHER PUBLICATIONS

European Search Report for application No. 15 741 755.1 1009, dated Sep. 4, 2018.
(Continued)

*Primary Examiner* — Mark A Laurenzi
*Assistant Examiner* — Mickey H France
(74) *Attorney, Agent, or Firm* — Schmeiser, Olsen & Watts LLP

(57) ABSTRACT

A thermal energy storage plant is provided including a charging circuit and a discharging circuit, the charging circuit including: a first fluid transporting machine for generating a flow of a working fluid in the charging circuit, a heating device for transferring heat to the working fluid, a main heat accumulator for storing the thermal energy of the working fluid, the discharging circuit including the main heat accumulator, a heat exchanger included in a thermal cycle for transforming the thermal energy stored into mechanical power, the thermal energy storage plant further comprising a secondary heat accumulator including a first end connected to the charging circuit, downstream the heating device, a second end connected to the discharging circuit, upstream the heat exchanger.

11 Claims, 3 Drawing Sheets

(51) Int. Cl.
*F01K 5/00* (2006.01)
*F28D 20/00* (2006.01)

(52) U.S. Cl.
CPC ............... *F28D 2020/0078* (2013.01); *F28D 2020/0082* (2013.01); *Y02E 10/46* (2013.01)

(58) Field of Classification Search
CPC ......... F01K 5/00; Y02E 10/46; Y02E 60/142; Y02E 60/145
USPC ........................................................... 60/659
See application file for complete search history.

(56) References Cited

U.S. PATENT DOCUMENTS

2008/0066736 A1   3/2008  Zhu
2014/0008033 A1*  1/2014  Howes ................ F28D 20/0056
                                                          165/10

FOREIGN PATENT DOCUMENTS

| JP | S60162038 A | 8/1985 |
|----|-------------|--------|
| KR | 101452412 B1 | 10/2014 |
| WO | 2009082713 A1 | 7/2009 |

OTHER PUBLICATIONS

PCT International Search Report and Written Opinion of International Searching Authority dated Dec. 4, 2015 corresponding to PCT International Application No. PCT/EP2015/055913.
Non-English Chinese Office Action dated Nov. 15, 2018 for application No. 201580078036.4.

* cited by examiner

THERMAL ENERGY STORAGE PLANT

CROSS-REFERENCE TO RELATED APPLICATIONS

This application claims priority to PCT Application No. PCT/EP2015/055913, having a filing date of Mar. 20, 2015, the entire contents of which are hereby incorporated by reference.

FIELD OF TECHNOLOGY

The following relates to a plant for storing thermal energy and to a method for operating such plant.

BACKGROUND

The integration of renewable energy into the main power supply network challenges the energy grid, since it was designed for central power production. Electricity generated by renewable energy sources has an unlimited precedence for power supply to the electricity network to support the integration in the energy system and increase its share of the electricity production. Energy production from renewable energy sources is difficult to forecast and depends on weather conditions such as wind speed and solar radiation. To handle this fluctuating production, renewable energy sources have to be curtailed, fossil fueled power plants providing base load need to become more flexible or energy prices reduce strongly due to the high supply. In addition, the location of production of renewable energy such as onshore and offshore wind does not coincide with the region of high power consumption.

Therefore, energy storages play an important role in the improvement of the stability of power supply networks.

Sensible thermal storages are state of the art for storing fluctuating energy from renewable sources. Electrical excess energy from the main supply grid is transformed into thermal energy and is stored in some storage material. In times with no or low occurrence of wind, the stored thermal energy is used for generating steam to produce electrical energy over a steam turbo generator and the produced electricity is fed in the main supply grid.

A possible solution of thermal energy storage plant is a combination of a charge cycle and a discharge cycle, having in common a thermal energy storage device. The charge cycle comprises, in a closed loop, a fluid transporting machine, e.g. a fan, a heating device, which may be a resistant or inductive heater fed by the electrical power generated by a renewable energy source, and the thermal energy storage device. The discharge cycle comprises, in a closed loop, the same thermal energy storage device of the charge cycle, a fluid transporting machine, e.g. a fan or a blower and a water steam cycle. The water steam cycle includes a thermal machine such as a steam turbine and a heat recovery steam generator (HRSG), a boiler, a heat exchanger or an evaporator, for transferring the thermal energy to water to generate steam which is fed to the thermal machine to produce electrical power from an electrical generator connected to the thermal machine.

The thermal energy storage device comprises typically solid or bulk materials, for example stones, bricks, ceramics and other solid materials, which have high thermal capacity to store thermal energy over a long period of time.

These materials are heated using a working fluid, e.g. air, circulating in the charge cycle, which has a temperature higher than the storage material. In the discharge cycle the stored energy is recovered through a flow of the same or different fluid, which has a lower temperature than the storage material. Due to the temperature differences in flow direction in both cycles, the storage device has a respective hot and a cold end.

In the charge cycle, the thermal energy storage device is connected by a pipe or ducting system to the heating device and to the fluid transporting machine. The fluid transporting machine transports the working fluid through the heating device to the hot end of the thermal storage. A temperature front travels through the storage from the hot end to the cold end. The temperature front is a zone of strong temperature gradient in the storage, which separates the hot and the cold zone in the storage. The charging of the thermal energy storage stops, when the temperature at the cold end begins to rise.

In the discharge cycle the mass flow of the working fluid is guided through the storage device in the opposite direction compared to the charge cycle. In the discharge cycle the working fluid enters the storage at the cold end, reaches the assigned temperature due to heat transfer from the storage material to the working fluid and leaves at the hot end before the working fluid enters the steam generator.

The temperature front travels in reverse direction compared to the charging cycle through the storage device. When discharging the thermal energy storage device the temperature front moves through the storage from the cold end to the hot end. Consequently the temperature of the working fluid which leaves the thermal energy storage device and feeds, for example, the HRSG decreases continuously during a part of the discharging process. This non-homogenous temperature of the working fluid in the discharging circuit leads to a decreasing performance of the thermal machine connected thereto and hence to a non-constant electricity production from the electrical generator.

There may be a need for improving a thermal energy storage plant in such a manner that the above mention inconveniences can be suppressed or reduced in an optimized way.

SUMMARY

An aspect relates to a thermal energy storage plant comprising a charging circuit and a discharging circuit, the charging circuit including:
  a first fluid transporting machine for generating a flow of a working fluid in the charging circuit,
  a heating device for transferring heat to the working fluid,
  a main heat accumulator for storing the thermal energy of the working fluid;
the discharging circuit including:
  the main heat accumulator,
  a heat exchanger included in a thermal cycle for transforming the thermal energy stored in the main heat accumulator into mechanical power,
Wherein the thermal energy storage plant further comprises a secondary heat accumulator including:
  a first end connected to the charging circuit, downstream the heating device,
  a second end connected to the discharging circuit, upstream the heat exchanger.
The secondary heat accumulator is capable of working as thermal energy boost storage for a constant load performance during discharge of the main heat accumulator, in particular when the decrease of the temperature of the working fluid in the discharging circuit would lead, if not compensated by the working fluid coming from the secondary heat accumulator, to a decreasing performance of the thermal machine connected thereto and hence a non-constant electricity production from the electrical generator.

According to a possible embodiment of the present invention, the secondary heat accumulator has a lower thermal capacity than the main heat accumulator. Advantageously, this assures that the secondary boost heat accumulator is charged completely at a homogenous temperature level at its length, during the charging of the main heat accumulator.

According to another possible embodiment of the present invention, the thermal energy storage plant further comprises at least a valve upstream and/or downstream the secondary heat accumulator for isolating the secondary heat accumulator from the charging circuit and/or the discharging circuit, respectively. Advantageously, this allows using the secondary heat accumulator to be preferably used when the working fluid temperature coming from the main accumulator during discharge is not high enough, for example for steam production in a HRSG. This will reduce additional pressure losses when the second heat accumulator is not used and optimize the overall plant efficiency during discharge.

According to another possible embodiment of the present invention, the thermal energy storage plant further comprises a second fluid transporting machine upstream or downstream the secondary heat accumulator.

According to a further aspect of the invention there is provided a method for operating the thermal energy storage plant described above, the method comprising the steps of:
  heating the working fluid,
    generating a flow of the working fluid in the charging circuit, for charging the main heat accumulator and the secondary heat accumulator.

According to two different embodiments of the present invention the main heat accumulator and the secondary heat accumulator may be charged respectively in parallel or in series. The connection in parallel may be obtained by connecting the hot end of the main heat accumulator and the first end of the secondary heat accumulator downstream the heating device and by connecting the second end of the secondary heat accumulator to the hot end of the main heat accumulator.

The connection in series may be obtained by disconnecting the hot end of the main heat accumulator from the heating device, by connecting the first end of the secondary heat accumulator downstream the heating device and by connecting the second end of the secondary heat accumulator to the hot end of the main heat accumulator.

According to a possible embodiment of the present invention, the method further comprises the step of stopping the heating and the flow of the working fluid after a constant temperature distribution is created in the secondary heat accumulator, from a first end to a second end of the secondary heat accumulator.

According to another possible embodiment of the present invention, the method comprises the steps of:
  generating a flow of the working fluid in the discharging circuit for transferring heat from the main heat accumulator to the working fluid,
  connecting the first end of the secondary heat accumulator to the charging circuit and connecting the second end of the secondary heat accumulator to the discharging circuit when the temperature at a hot end of the main heat accumulator is below a predetermined value. Advantageously, this will allow an efficient functioning of the heat exchanger included in the discharging cycle.

In general, the method according to embodiments of the present invention permits to reach the same advantages described above with reference to the plant apparatus according embodiments of to present invention.

It has to be noted that embodiments of the invention have been described with reference to different subject matters. In particular, some embodiments have been described with reference to apparatus type claims whereas other embodiments have been described with reference to method type claims. However, a person skilled in the art will gather from the above and the following description that, unless other notified, in addition to any combination of features belonging to one type of subject matter also any combination between features relating to different subject matters, in particular between features of the apparatus type claims and features of the method type claims is considered as to be disclosed with this document.

BRIEF DESCRIPTION

Some of the embodiments will be described in detail, with reference to the following figures, wherein like designations denote like members, wherein.

DETAILED DESCRIPTION

Figure 1:
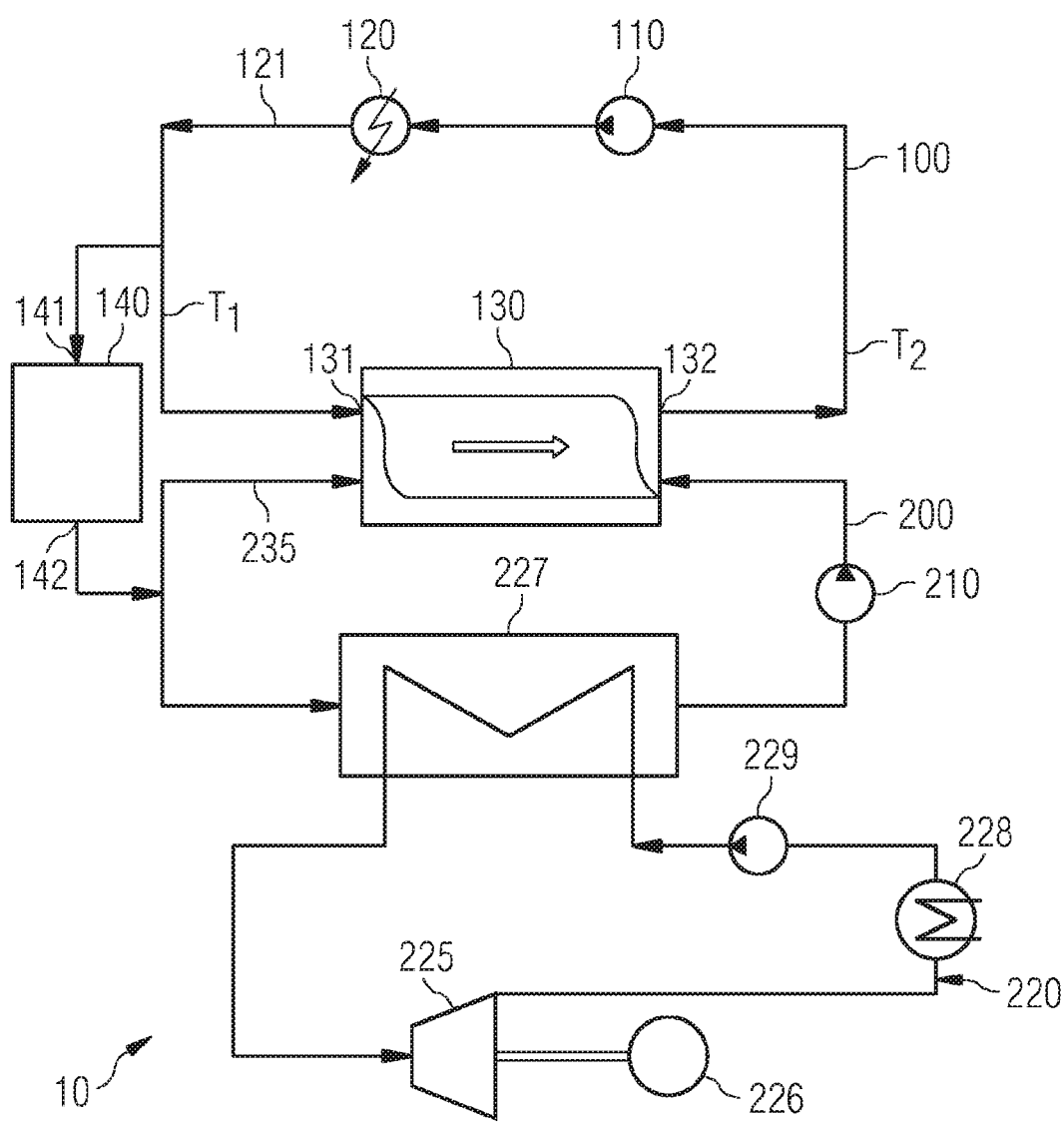
FIG. 1 shows a schematic diagram of a thermal energy storage plant, according to embodiments of the present invention.

The illustration in the drawing is schematically. It is noted that in different figures, similar or identical elements or features are provided with the same reference signs. In order to avoid unnecessary repetitions elements or features which have already been elucidated with respect to a previously described embodiment are not elucidated again at a later position of the description.

Figure 2:
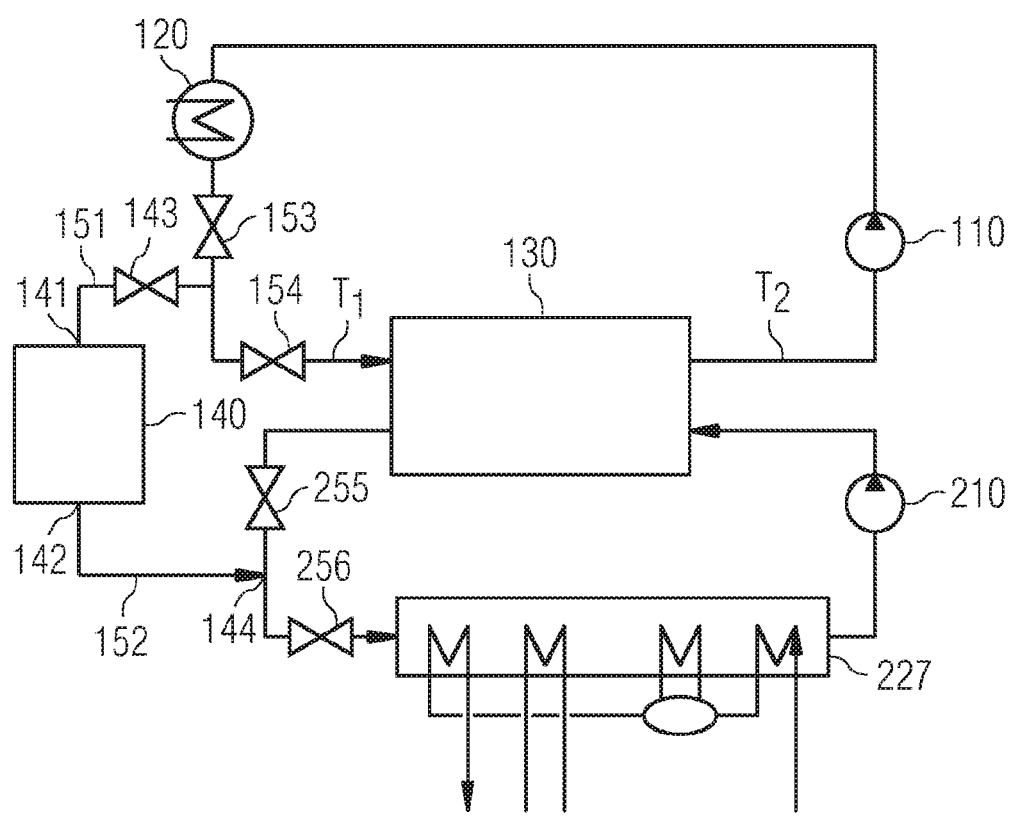
FIG. 2 shows a partial schematic view of the diagram of FIG. 1, showing with more details some components of a first embodiment of the thermal energy storage plant, according to embodiments of the present invention.

FIGS. 1 and 2 schematically show a thermal energy storage plant 10 comprising a charging circuit 100 and a discharging circuit 200, where a working fluid, in particular hot air, is circulated.

According to other possible embodiments, the working fluid may be a different gaseous or liquid medium.

The charging circuit 100 includes, in a closed loop:
  a first fluid transporting machine 110 for generating a flow of the working fluid in the charging circuit 100,
  a heating device 120 electrically powered for transferring heat to the working fluid,
  a heat accumulator 130 for storing the thermal energy of the working fluid, the heat accumulator 130 including
    a hot end 131 for receiving the first working fluid at a first high temperature T1 and a cold end 132 for releasing the working fluid from the heat accumulator 130 at a second low temperature T2 lower than the first high temperature T1.

In the attached figures, the first fluid transporting machine 110 is immediately downstream the cold end 132 of the heat accumulator 130 and the outlet of the heating device 120 is connected to the hot end 131 of the heat accumulator 130 by means of a charging duct 121. According to another possible embodiment of the present invention (not shown), the heating device 120 is immediately downstream the cold end 132 of the heat accumulator 130 and upstream the first fluid transporting machine 110.

When the working fluid is air, the first fluid transporting machine 110 may be constituted by a fan or blower.

The heating device 120 may be a resistant or inductive heater or a heat pump fed by the electrical power generated by a renewable energy source, for example the wind speed generating power by means of a wind turbine or solar radiation generating power by means of photovoltaic cells.

The heating device 120 permits the first hot temperature T1 and the second low temperature T2 to be established between the hot end 131 and cold end 132 of the heat accumulator 130. According to possible embodiments of the present invention, typical values are T1=600° C. and T2=200° C.

In general, other values are possible, the value of hot temperature T1 depends from the operating temperature of a thermal cycle 220 comprised in the discharging circuit 200 for transforming the thermal energy from the second working fluid into mechanical power, as detailed in the following. The low temperature T2 can also be ambient, but is typically kept higher than ambient temperature in order to reduce the heat load required in the heating device 120 for raising the first working fluid temperature up to the hot temperature T1 and to design the heat exchanger surface of the steam generator in an economical way.

According to possible embodiments of the present invention, the heat accumulator 130 is oriented in such a way that first working fluid is circulated from the hot end 131 to the cold end 132. In such type of installations, the temperature front which forms between the hot end 131 and the cold 132 of the heat accumulator 130 travels horizontally, from the hot end 131 to the cold end 132. The temperature front so oriented typically tends to flatten, in particular during idle periods, between charging and discharging operations, for the effect of natural convection.

The discharging circuit 200 includes, in closed loop:
 the heat accumulator 130,
 a heat exchanger 227 included in a thermal cycle 220 for transforming the thermal energy from the second working fluid into mechanical power. The heat exchanger 227 and the heat accumulator 130 are connected by means of a discharging duct 235,
 a second fluid transporting machine 210 for generating a flow of the working fluid in the discharging circuit 200, oriented from the cold end 132 to the hot end 131 of the heat accumulator 130. The working fluid of the discharging circuit 200 flows therefore in opposite direction with respect to the flow of the working fluid in the charging circuit 100.

According to a possible embodiment of the present invention, the thermal cycle 220 is a cycle including a thermal machine 225 and the steam generator 227 for transferring thermal energy from the second working fluid to a mass of water in order to generate steam to be fed to the thermal machine 225. The thermal machine 225 may be a steam turbine having an output shaft connected to an electrical generator 226 to produce electricity to be fed in a main supply grid. According to other possible embodiment, the thermal cycle 220 may include, instead of the steam generator 227, a boiler or an evaporator or other type of heat exchanger for transferring heat to the second working fluid to the thermal cycle 220.

The thermal cycle 220 further includes a condenser 228, connected to the outlet of the steam turbine 225 and a pump 229, between the condenser 228 and steam generator 227. Other types of thermal cycles may be used instead of the described thermal cycle 220, provided that, in general, they are able to transform the thermal energy of the second thermal cycle 220 into mechanical power for powering the electrical generator 226.

The thermal energy storage plant 10 further comprises a secondary heat accumulator 140 including:
 a first upstream end 141 connected to the charging circuit 100, downstream the heating device 120,
 a second downstream end 142 connected to the discharging circuit 200, upstream the heat exchanger 227.

Figure 3:
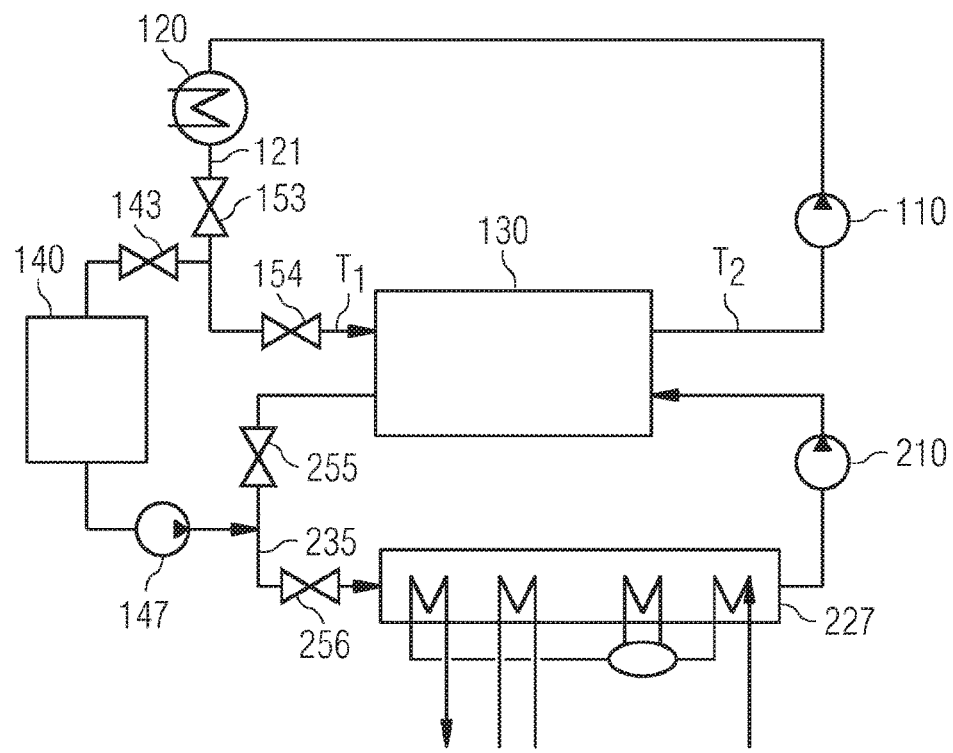
FIG. 3 shows a partial schematic view of the diagram of FIG. 1, showing with more details some components of a second embodiment of the thermal energy storage plant, according to embodiments of the present invention.

In particular, with reference to the attached FIGS. 1 to 3, the first upstream end 141 is connected to the charging duct 121 through an upstream duct 151 and the second downstream end 142 is connected to the discharging duct 235 through a downstream duct 152.

The secondary heat accumulator 140 has a lower thermal capacity than the main heat accumulator 130, which determines that it will be charged completely at the homogenous temperature level T1, at all its length, from the first end 141 to the second end 142. In particular, the secondary heat accumulator 140 has a thermal capacity which is 10% to 40% of the thermal capacity of the main heat accumulator 130.

After the secondary heat accumulator 140 is fully charged the flow of the working fluid is only guided through the main heat accumulator 130. Charging is normally stopped when the temperature front reaches the cold end 132 of the main heat accumulator 130. During idle periods, natural convection occurs therefore only in the main heat accumulator 130.

The thermal energy storage plant 10 further comprises an upstream valve 143 in the upstream duct 151, for isolating the secondary heat accumulator 140 from the charging circuit 100. The thermal energy storage plant 10 may further optionally (FIG. 3) comprise a second fluid transporting machine 147 in the downstream duct 152, for regulating the flow from the secondary heat accumulator 140 to the heat exchanger 227. When the working fluid is air, the second fluid transporting machine 147 may be constituted by a fan or blower.

According to another possible embodiment of the invention (not shown) the second fluid transporting machine may be installed in the upstream duct 151.

The charging duct 121 comprises a charging valve 153 upstream the upstream duct 151. The charging duct 121 comprises a second charging valve 154 between the upstream duct 151 and the main heat accumulator 130.

The discharging duct 235 comprises a first discharging valve 255 between the main heat accumulator 130 and the downstream duct 152 and a second discharging valve 256 between the downstream duct 152 and the steam generator 227.

The discharging valves 255, 256 may be operated for connecting or isolating the secondary heat accumulator 140 respectively with the main heat accumulator 130, during charging operations, or with the steam generator 227, during discharging operations, as better specified in the following, with reference to the method of operating the thermal energy storage plant 10.

Figure 4:
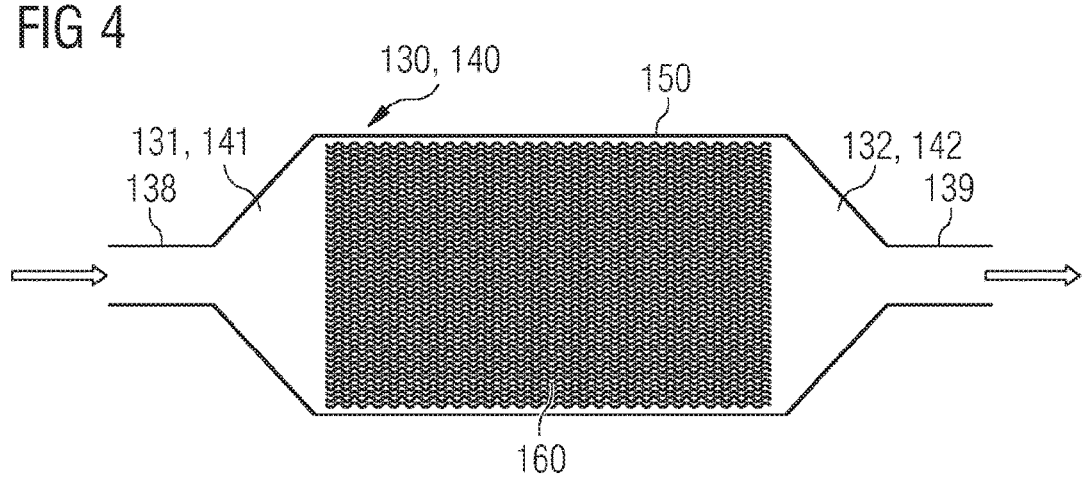
FIG. 4 shows a schematic section view of a component of the thermal energy storage plant of FIGS. 1, 2 and 3.

With reference to FIG. 4, the main heat accumulator 130 and the secondary heat accumulator 140 have a common structure, differing from each other only by dimensions, which determines different thermal capacities. Both of them comprise a housing 150 extending from an inlet 138 to an outlet 139.

In the main heat accumulator 130 the inlet 138 and the outlet 139 respectively correspond to the hot end 131 and the cold end 132. In the secondary heat accumulator 140, the inlet 138 and the outlet 139 respectively correspond to the upstream end 141 and the downstream end 142.

The housing 150 comprises a plurality of heat storing elements 160 having high thermal capacity, for example solid or bulk materials like stones, bricks, ceramics and other solid materials, which have the ability to be heated up and to keep their temperature over a long period of time in order to store the thermal energy which has been transferred to them. When the charging circuit 100 is operated, the working fluid, for example air, flows from the inlet 138 to the outlet 139, transferring heat to storing elements 160. When the discharging circuit 200 is operated, the same working fluid receives heat from the storing elements 160. During discharge, the working fluid in the main heat accumulator 130 flows from the outlet 139 to the inlet 138, in the secondary heat accumulator 140 the working fluid still flows from the inlet 138 to the outlet 139.

According to other possible embodiments of the present invention, other types of thermal energy storage device may be used, in particular, the main heat accumulator 130 and the secondary heat accumulator 140 may be different from each other.

According to embodiments of the present invention, a method for operating the thermal energy storage plant 10, during charging of the main heat accumulator 130 and of the secondary heat accumulator 140, comprises the steps of:
  heating the working fluid,
  generating a flow of the working fluid in the charging circuit 100 for charging the main heat accumulator 130 and the secondary heat accumulator 140,
  stopping the heating and the flow of the working fluid after a constant temperature profile is created in the secondary heat accumulator 140, from a first end 141 to a second end 142 of the secondary heat accumulator 140.

With reference to FIGS. 3 and 4, one possibility for charging the main heat accumulator 130 and the secondary heat accumulator 140 is to connect them in parallel by connecting the hot end 131 of the main heat accumulator 130 and the first end 141 of the secondary heat accumulator 140 downstream the heating device 120 and by connecting the second end 142 of the secondary heat accumulator 140 to the hot end 131 of the main heat accumulator 130.

This can be performed by opening the upstream valve 143, both the charging valves 153, 154 in the charging duct 121 and the first discharging valve 255 while the second discharging valve 256 is kept close. In this case, the hot working fluid coming from the heating device 120 enters both the main heat accumulator 130 and the secondary heat accumulator 140, through the charging duct 121 and the upstream duct 151. In this parallel connection, the pressure loss in the portion of charging duct 121 comprised between the upstream duct 151 and the main heat accumulator 130 needs to be regulated, e.g. by regulating the opening degree of valve 154. This guarantees the flow through the secondary heat accumulator 140. Otherwise the flow would enter only the main heat accumulator 130 because the pressure loss through the direct path to the main heat accumulator 130 is lower compared to the path via the secondary heat accumulator 140.

From the second end 142 of the secondary heat accumulator 140 the working fluid enters the main heat accumulator 130 also through the first discharging valve 255.

A second possibility is to connect the main heat accumulator 130 and the secondary heat accumulator 140 in series by disconnecting the hot end 131 of the main heat accumulator 130 from the heating device 120, by connecting the first end 141 of the secondary heat accumulator 140 downstream the heating device 120 and by connecting the second end 142 of the secondary heat accumulator 140 to the hot end 131 of the main heat accumulator 130.

This can be performed by opening the upstream valve 143, the first charging valve 153 in the charging duct 121 and the first discharging valve 255 while the second charging valve 154 and the second discharging valve 256 are both kept close. In this case, the hot working fluid coming from the heating device 120 enters the secondary heat accumulator 140, through the charging duct 121 and the upstream duct 151. From the second end 142 of the secondary heat accumulator 140 the working fluid enters then the main heat accumulator 130 through the first discharging valves 255.

In both cases, after the charging of the secondary heat accumulator 140 has been completed, the temperature profile inside it is constant from the respective inlet 138 to the respective outlet 139. This will prevent the occurrence of natural convection. This condition can be maintained easily by closing the upstream valve 143 and the first discharging valves 255.

When, during discharge of the main heat accumulator 130, the temperature of hot air coming from the main heat accumulator 130 is higher than a predefined temperature, which assures a regular functioning of the heat exchanger 227, the secondary heat accumulator 140 can be conveniently kept isolated from the main heat accumulator 130.

When the temperature of hot air coming from the main heat accumulator 130 is below such predefined value of temperature, which depends in particular from type and dimensions of the heat exchanger 227, the secondary heat accumulator 140 is put in communication with the heat exchanger 227 for constant discharging performance.

According to embodiments of the present invention, this can be achieved by a method for operating the thermal energy storage plant 10, during discharging of the main heat accumulator 130 and of the secondary heat accumulator 140, which comprises the steps of:
  generating a flow of the working fluid in the discharging circuit 200 for transferring heat from the main heat accumulator 130 to the working fluid,
  connecting the first end 141 of the secondary heat accumulator 140 to the charging circuit 100 and the second end 142 of the secondary heat accumulator 140 to the discharging circuit 200 when the temperature T1 at a hot end 131 of the main heat accumulator 130 is below a predetermined value.

During discharge the temperature T1 at the hot end 131 of the main heat accumulator 130 is subject to decrease. When the difference between the temperature T1 and the lowest temperature in the storage is 10%-30% less than the difference between the highest value of T1 (or the design value of T1) and the lowest temperature in the storage, then the first end 141 of the secondary heat accumulator 140 is connected to the charging circuit 100 and the second end 142 of the secondary heat accumulator 140 is connected to the discharging circuit 200.

In particular, with reference to FIGS. 3 and 4, this can be obtained by closing the first charging valve 153 and the first discharging valve 255 while the second charging valve 154 and the second discharging valve 256 are kept open.

The flow of the working fluid coming from the heat exchanger 227 flows through the fluid transport machine 210, the main heat accumulator 130, the portion of the charging duct 121 including the second charging valve 154, the upstream duct 151, the secondary heat accumulator 140, the downstream duct 152, the portion of the discharging duct 235 including the second discharging valve 256 and it is guided finally into the heat exchanger 227.

Although the invention has been described and illustrated in detail by way of the preferred exemplary embodiment, the invention is not restricted by the disclosed examples and other variations can be derived herefrom by a person skilled in the art without departing from the scope of protection of the invention.

For the sake of clarity, it is to be understood that the use of 'a' or 'an' throughout this application does not exclude a plurality, and 'comprising' does not exclude other steps or elements.

The invention claimed is:

1. A thermal energy storage plant comprising a charging circuit and a discharging circuit, the charging circuit including:
   a first fluid transporting machine for generating a flow of a working fluid in the charging circuit,
   a heating device for transferring heat to the working fluid,
   a main heat accumulator for storing the thermal energy of the working fluid;
the discharging circuit including:
   the main heat accumulator,
   a heat exchanger included in a thermal cycle for transforming the thermal energy stored in the main heat accumulator into mechanical power,
wherein thermal energy storage plant further comprises a secondary heat accumulator including:
   a first end connected to the charging circuit, downstream the heating device,
   a second end connected to the discharging circuit, upstream the heat exchanger, and
   wherein, when the temperature at a hot end of the main heat accumulator is below a predetermined value, the first end of the secondary heat accumulator is connected to the charging circuit and the second end of the secondary heat accumulator is connected to the discharging circuit.

2. The thermal energy storage plant according to claim 1, wherein the secondary heat accumulator has a lower thermal capacity than the main heat accumulator.

3. The thermal energy storage plant according to claim 1, further comprising at least a valve between the secondary heat accumulator and the charging circuit.

4. The thermal energy storage plant according to claim 1, further comprising at least a first and a second discharging valves between the secondary heat accumulator and, respectively, the main heat accumulator and the heat exchanger.

5. The thermal energy storage plant according to claim 1, further comprising a second fluid transporting machine upstream or downstream the secondary heat accumulator.

6. The thermal energy storage plant according to claim 1, wherein the heating device is powered from a renewable energy source.

7. The thermal energy storage plant according to claim 1, wherein the secondary heat accumulator has 10% to 40% of the thermal capacity of the main heat accumulator.

8. A method for operating the thermal energy storage plant according to claim 1, the method comprising the steps of:
   heating the working fluid,
   generating a flow of the working fluid in the charging circuit, for charging the main heat accumulator and the secondary heat accumulator.

9. The method according to claim 8, wherein the main heat accumulator and the secondary heat accumulator are charged in parallel by connecting a hot end of the main heat accumulator and the first end of the secondary heat accumulator downstream the heating device and by connecting the second end of the secondary heat accumulator to the hot end of the main heat accumulator.

10. The method according to claim 8, wherein the main heat accumulator and the secondary heat accumulator are charged in series by disconnecting a hot end of the main heat accumulator from the heating device, by connecting the first end of the secondary heat accumulator downstream the heating device and by connecting the second end of the secondary heat accumulator to the hot end of the main heat accumulator.

11. The method according to claim 8, further comprising the step of stopping the heating and the flow of the working fluid after a constant temperature profile is created in the secondary heat accumulator, from a first end to a second end of the secondary heat accumulator.

* * * * *